United States Patent
Liu et al.

(10) Patent No.: US 11,144,950 B2
(45) Date of Patent: Oct. 12, 2021

(54) INFORMATION DELIVERY METHOD AND APPARATUS, SERVER, AND STORAGE MEDIUM

(71) Applicant: Tencent Technology (Shenzhen) Company Limited, Guangdong (CN)

(72) Inventors: Dapeng Liu, Guangdong (CN); Lei Xiao, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 383 days.

(21) Appl. No.: 15/804,559

(22) Filed: Nov. 6, 2017

(65) Prior Publication Data
US 2018/0060903 A1    Mar. 1, 2018

Related U.S. Application Data

(63) Continuation of application No. PCT/CN2016/113842, filed on Dec. 30, 2016.

(30) Foreign Application Priority Data

Jan. 12, 2016 (CN) .......................... 201610017753.2

(51) Int. Cl.
G06Q 30/00 (2012.01)
G06Q 30/02 (2012.01)
G06N 7/00 (2006.01)

(52) U.S. Cl.
CPC ......... G06Q 30/0243 (2013.01); G06N 7/005 (2013.01); G06Q 30/0241 (2013.01); G06Q 30/0246 (2013.01); G06Q 30/0282 (2013.01)

(58) Field of Classification Search
CPC ............... G06Q 30/02; G06Q 30/0243; G06Q 30/0246; G06Q 30/0251; G06Q 30/0282;
(Continued)

(56) References Cited

U.S. PATENT DOCUMENTS 7,039,599 B2    5/2006 Merriman et al.
7,136,875 B2    11/2006 Anderson et al.
(Continued)

FOREIGN PATENT DOCUMENTS

CN    101673385 A    3/2010
CN    102346899 A    2/2012
(Continued)

OTHER PUBLICATIONS

International Search Report in English & Chinese and Written Opinion in Chinese of the ISA regarding Application No. PCT/CN2016/113842, Haidian District, Beijing, dated Apr. 1, 2017.
(Continued)

*Primary Examiner* — Sun M Li
(74) *Attorney, Agent, or Firm* — Anova Law Group, PLLC

(57) ABSTRACT

An information delivery method is provided, including: determining a candidate information list in response to a page request sent by a user, where the candidate information list comprises a plurality pieces of information; generating ranks of the pieces of information in the candidate information list by sorting the plurality pieces of information in the candidate information list in accordance with a predetermined rule; acquiring a current average rank of the information of a designated type in the candidate information list based on the ranks of the pieces of information in the candidate information; and selecting designated delivery information from the information of the designated type, based on the current average rank of the information of the designated type and a historical average rank corresponding to the information of the designated type.

14 Claims, 6 Drawing Sheets

(58) Field of Classification Search
CPC .......... G06Q 30/0241; G06Q 30/0244; G06Q 30/0277; G06N 7/005; G06N 20/00
USPC .......................................... 705/14.42, 14.73
See application file for complete search history.

(56) References Cited

U.S. PATENT DOCUMENTS

| | | |
|---|---|---|
| 7,346,606 B2 | 3/2008 | Bharat |
| 7,668,832 B2 | 2/2010 | Yeh et al. |
| 7,680,796 B2 | 3/2010 | Yeh et al. |
| 7,693,830 B2 | 4/2010 | Guha |
| 7,716,161 B2 | 5/2010 | Dean et al. |
| 7,716,199 B2 | 5/2010 | Guha |
| 7,734,624 B2 | 6/2010 | Anderson et al. |
| 7,743,045 B2 | 6/2010 | Guha |
| 7,778,872 B2 | 8/2010 | Kamangar et al. |
| 7,792,698 B1 | 9/2010 | Veach et al. |
| 7,844,493 B1 | 11/2010 | Veach et al. |
| 7,937,405 B2 | 5/2011 | Anderson et al. |
| 8,051,063 B2 | 11/2011 | Guha |
| 8,078,494 B2 | 12/2011 | Kamangar et al. |
| 8,086,559 B2 | 12/2011 | Anderson et al. |
| 8,090,706 B2 | 1/2012 | Bharat |
| 8,171,034 B2 | 5/2012 | Dean et al. |
| 8,229,957 B2 | 7/2012 | Gehrking et al. |
| 8,296,285 B2 | 10/2012 | Bharat |
| 8,316,040 B2 | 11/2012 | Guha |
| 8,352,499 B2 | 1/2013 | Bharat et al. |
| 8,447,653 B2 | 5/2013 | Veach et al. |
| 8,452,746 B2 | 5/2013 | Guha |
| 8,504,551 B2 | 8/2013 | Anderson et al. |
| 8,549,033 B2 | 10/2013 | Yeh et al. |
| 8,560,388 B2 | 10/2013 | Yeh et al. |
| 8,560,493 B2 | 10/2013 | Agarwal et al. |
| 8,566,154 B2 | 10/2013 | Merriman et al. |
| 8,756,210 B1 | 6/2014 | Guha |
| 8,762,203 B2 | 6/2014 | Veach et al. |
| 8,788,338 B1 | 7/2014 | Ruiz et al. |
| 8,812,359 B2 | 8/2014 | Yeh et al. |
| 8,818,856 B2 | 8/2014 | Yeh et al. |
| 8,918,395 B2 | 12/2014 | Gehrking et al. |
| 9,031,937 B2 | 5/2015 | Guha |
| 9,152,718 B2 | 10/2015 | Anderson et al. |
| 9,235,849 B2 | 1/2016 | Bharat et al. |
| 9,501,784 B2 | 11/2016 | Johnson et al. |
| 9,659,309 B2 | 5/2017 | Dean et al. |
| 9,799,052 B2 | 10/2017 | Dean et al. |
| 9,971,813 B2 | 5/2018 | Gehrking et al. |
| 10,032,452 B1 | 7/2018 | Bhaya et al. |
| 2002/0082923 A1 | 6/2002 | Merriman et al. |
| 2002/0099600 A1 | 7/2002 | Merriman et al. |
| 2003/0046161 A1 | 3/2003 | Kamangar et al. |
| 2004/0059708 A1 | 3/2004 | Dean et al. |
| 2004/0059712 A1 | 3/2004 | Dean et al. |
| 2004/0093327 A1 | 5/2004 | Anderson et al. |
| 2004/0167928 A1 | 8/2004 | Anderson et al. |
| 2004/0267723 A1 | 12/2004 | Bharat |
| 2005/0021397 A1 | 1/2005 | Cui et al. |
| 2005/0050027 A1 | 3/2005 | Yeh et al. |
| 2005/0050097 A1 | 3/2005 | Yeh et al. |
| 2005/0076014 A1 | 4/2005 | Agarwal et al. |
| 2005/0114198 A1 | 5/2005 | Koningstein et al. |
| 2005/0131762 A1 | 6/2005 | Bharat et al. |
| 2005/0222901 A1 | 10/2005 | Agarwal et al. |
| 2006/0004627 A1 | 1/2006 | Baluja |
| 2006/0069616 A1 | 3/2006 | Bau |
| 2006/0089880 A1 | 4/2006 | Merriman et al. |
| 2006/0149624 A1 | 7/2006 | Baluja et al. |
| 2006/0242147 A1 | 10/2006 | Gehrking et al. |
| 2006/0259455 A1 | 11/2006 | Anderson et al. |
| 2006/0282328 A1* | 12/2006 | Gerace ............... G06Q 30/0273 705/14.66 |
| 2007/0038600 A1 | 2/2007 | Guha |
| 2007/0038601 A1 | 2/2007 | Guha |
| 2007/0038603 A1 | 2/2007 | Guha |
| 2007/0038614 A1 | 2/2007 | Guha |
| 2007/0038616 A1 | 2/2007 | Guha |
| 2008/0033810 A1 | 2/2008 | Chu |
| 2008/0097833 A1 | 4/2008 | Bharat |
| 2008/0256061 A1* | 10/2008 | Chang ................... G06Q 30/02 |
| 2010/0100437 A1 | 4/2010 | Dean et al. |
| 2010/0131350 A1 | 5/2010 | Yeh et al. |
| 2010/0174605 A1 | 7/2010 | Dean et al. |
| 2010/0185513 A1 | 7/2010 | Anderson et al. |
| 2010/0217756 A1 | 8/2010 | Guha |
| 2010/0223250 A1 | 9/2010 | Guha |
| 2010/0250513 A1 | 9/2010 | Guha |
| 2010/0274660 A1 | 10/2010 | Kamangar et al. |
| 2010/0287056 A1 | 11/2010 | Koningstein et al. |
| 2010/0293060 A1 | 11/2010 | Veach et al. |
| 2011/0040614 A1 | 2/2011 | Veach et al. |
| 2011/0145731 A1 | 6/2011 | Anderson et al. |
| 2011/0191309 A1 | 8/2011 | Anderson et al. |
| 2011/0231241 A1 | 9/2011 | Kesari et al. |
| 2011/0264508 A1 | 10/2011 | Harik et al. |
| 2012/0072278 A1 | 3/2012 | Kamangar et al. |
| 2012/0072291 A1 | 3/2012 | Bharat |
| 2012/0095837 A1 | 4/2012 | Bharat et al. |
| 2012/0109742 A1 | 5/2012 | Yeh et al. |
| 2012/0109744 A1 | 5/2012 | Yeh et al. |
| 2012/0116884 A1 | 5/2012 | Yeh et al. |
| 2012/0173334 A1 | 7/2012 | Dean et al. |
| 2012/0259856 A1 | 10/2012 | Gehrking et al. |
| 2013/0110627 A1 | 5/2013 | Guha |
| 2013/0124510 A1 | 5/2013 | Guha |
| 2013/0179271 A1 | 7/2013 | Adams et al. |
| 2013/0317905 A1 | 11/2013 | Warner et al. |
| 2013/0339350 A1 | 12/2013 | Wei et al. |
| 2014/0040027 A1 | 2/2014 | Anderson et al. |
| 2014/0058836 A1* | 2/2014 | Wiseman .............. G06Q 30/02 705/14.49 |
| 2014/0122235 A1 | 5/2014 | Agarwal et al. |
| 2014/0214551 A1 | 7/2014 | Baluja et al. |
| 2014/0214790 A1 | 7/2014 | Vaish et al. |
| 2014/0316893 A1 | 10/2014 | Yeh et al. |
| 2014/0337128 A1 | 11/2014 | Carobus et al. |
| 2014/0351029 A1 | 11/2014 | Dean et al. |
| 2014/0351062 A1 | 11/2014 | Veach et al. |
| 2015/0012356 A1 | 1/2015 | Dean et al. |
| 2015/0088896 A1 | 3/2015 | Gehrking et al. |
| 2016/0055526 A1 | 2/2016 | Okuno |
| 2016/0055530 A1 | 2/2016 | Dean et al. |
| 2016/0110082 A1* | 4/2016 | Zhang ................ G06F 16/972 715/765 |
| 2016/0162931 A1 | 6/2016 | Harik et al. |
| 2016/0232580 A1 | 8/2016 | Baluja et al. |
| 2016/0299983 A1 | 10/2016 | Guha |
| 2017/0206556 A1 | 7/2017 | Dean et al. |
| 2017/0220694 A1 | 8/2017 | Vaish et al. |
| 2017/0237613 A1 | 8/2017 | Baluja |
| 2017/0237801 A1 | 8/2017 | Baluja et al. |
| 2017/0249664 A1 | 8/2017 | Harik et al. |
| 2017/0257456 A1 | 9/2017 | Vaish et al. |
| 2017/0300977 A1 | 10/2017 | Warner et al. |
| 2017/0372348 A1 | 12/2017 | Baluja |
| 2018/0005266 A1 | 1/2018 | Dean et al. |
| 2018/0190277 A1 | 7/2018 | Bhaya et al. |
| 2018/0191788 A1 | 7/2018 | Lewis et al. |

FOREIGN PATENT DOCUMENTS

| | | |
|---|---|---|
| CN | 102929939 A | 2/2013 |
| CN | 104933591 A | 9/2015 |
| CN | 104965890 A | 10/2015 |
| CN | 105678586 A | 6/2016 |
| JP | 2002524782 A | 8/2002 |
| JP | 2013182595 A | 9/2013 |
| JP | 2013218485 A | 10/2013 |
| JP | 2015046185 A | 3/2015 |
| KR | 20080103605 A | 11/2008 |
| KR | 20090001476 A | 1/2009 |
| KR | 20140119044 A | 10/2014 |

(56) References Cited

FOREIGN PATENT DOCUMENTS

| WO | WO-0008802 A2 | 2/2000 |
| WO | WO-2014155682 A1 | 10/2014 |
| WO | WO-2015127884 A1 | 9/2015 |

OTHER PUBLICATIONS

First Japanese Office Action regarding Patent Application No. 2017-559381 dated Dec. 20, 2018.
European Search Report regarding European Application No. 1688489.1 dated Jun. 17, 2019.
First Korean Office Action regarding Korean Patent Application No. 10-2017-7032826 dated Oct. 1, 2018.

\* cited by examiner

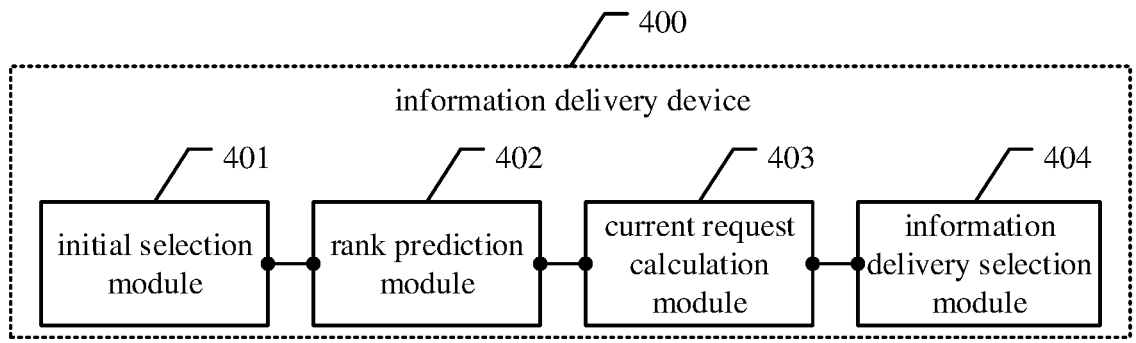
Figure 4-a
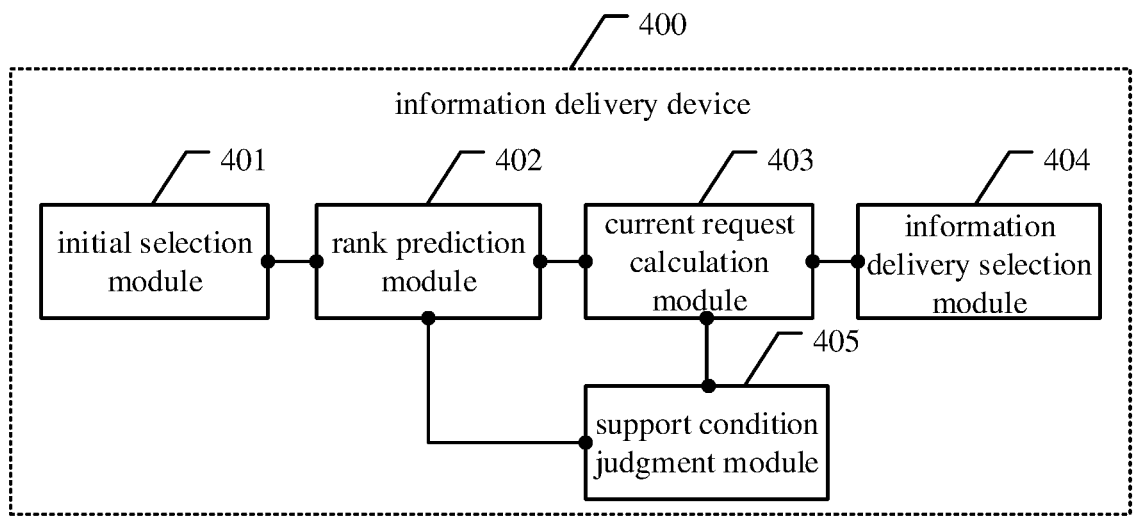
Figure 4-b

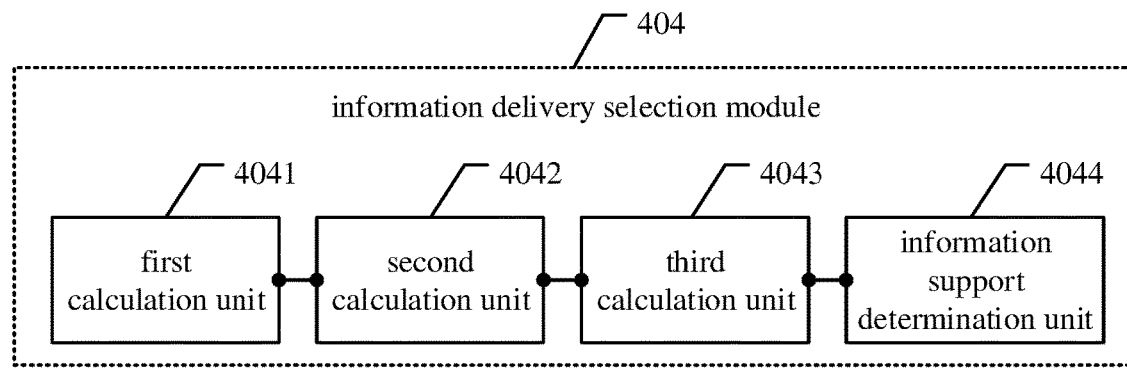
Figure 4-c
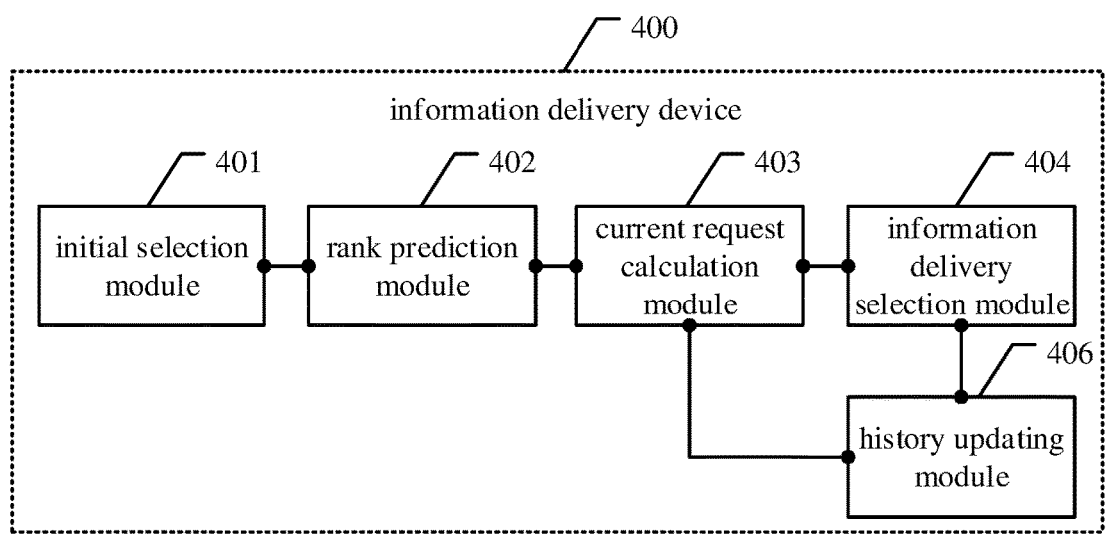
Figure 4-d

INFORMATION DELIVERY METHOD AND APPARATUS, SERVER, AND STORAGE MEDIUM

The present application is a continuation of International Patent Application No. PCT/CN2016/113842 filed on Dec. 30, 2016, which claims priority to Chinese Patent Application No. 201610017753.2, titled "INFORMATION SUPPORT METHOD AND INFORMATION SUPPORT DEVICE", filed on Jan. 12, 2016 with the State Intellectual Property Office of People's Republic of China, both of which are incorporated herein by reference in their entireties.

FIELD

The present disclosure relates to the technical field of information delivery, and in particular to an information delivery method, an information delivery device, a system and storage medium.

BACKGROUND

Information delivery means that, an information platform sends some related information to a user in response to a request received from the user. Both the user and the information producer can be benefitted from the information delivery. The information platform may analyze the request of the user to determine the user's preference of information. Therefore, the user may obtain more useful information than expected, and the producer of the information may achieve his goal if the user is actually interested in the information. Furthermore, there is often a requirement for supporting a certain type of information. That is, the certain type of information is expected to be delivered with priority.

The information platform needs to make a balance between the user's needs, the support on the certain type of information and the interest of the producer of other types of information. However, the information platform in the conventional technology only configure a proportion of dedicated flow to deliver the supported type of information, and randomly select the information to be delivered in accordance with the proportion. With this solution, although the supported type of information is delivered with a priority, it may be delivered to a user who is not interested in it, resulting in a poor information delivery effect.

SUMMARY

An information delivery method and an information delivery device are provided according to embodiments of the present disclosure, with which information of a supported type is supported while an information delivery effect is ensured.

In an aspect, an information delivery method is provided according to an embodiment of the present disclosure. The method includes:

determining a candidate information list in response to a page request sent by a user, where the candidate information list includes multiple pieces of information;

generating ranks of the pieces of information in the candidate information list;

acquiring a current average rank of the information of a designated type in the candidate information list based on the ranks of the pieces of information in the candidate information; and determining whether to take the information of the designated type as designated delivery information, based on the current average rank of the information of the designated type and a historical average rank corresponding to the information of the designated type.

In another aspect, an information delivery device is further provided according to an embodiment of the present disclosure. The device includes:

an initial selection module, configured to determine a candidate information list in response to a page request sent by a user, where the candidate information list includes multiple pieces of information;

a rank prediction module, configured to generate ranks of the pieces of information in the candidate information list;

a current request calculation module, configured to acquire a current average rank of the information of a designated type in the candidate information list based on the ranks of the pieces of information in the candidate information list; and an information delivery selection module, configured to determine whether to take the information of the designated type as designated delivery information based on the current average rank of the information of the designated type and a historical average rank corresponding to the information of the designated type.

It can be seen from the above technical solutions that, the embodiments of the present disclosure have the following advantages.

In the embodiments of the present disclosure, firstly, a candidate information list is determined in response to a page request sent by a user, with the candidate information list including multiple pieces of information. Then, ranks of the pieces of information in the candidate information list is predicted based on the page request and a preset prediction model, to generate the ranks of the pieces of information in the candidate information list. Next, a current average rank of the information of a designated type in the candidate information list is acquired based on the ranks of the pieces of information in the candidate information list. Finally, designated delivery information is selected from the information of the designated type based on the current average rank of the information of the designated type and a historical support average rank corresponding to the information of the designated type. In the embodiments of the present disclosure, after the user sends the page request, an initial selection is performed on all of the pieces of information in response to the page request to obtain a candidate information list matching with the user, and hence the information delivery is better targeted to user groups. A current average rank of information of a supported type in the candidate information list may be obtained by predicting the ranks of the pieces of information in the candidate information list. Finally, information to be supported is selected from the information of the supported type based on the current average rank of the information of the supported type and a historical support average rank corresponding to the supported type. Since the selected information to be supported is determined based on the historical support average rank corresponding to the supported type and the current average rank, the selected information to be supported is the information which is more matched with the user sending the page request, among all of the pieces of information in the candidate information list, thereby matching with the interests of the user and ensuring the information delivery effect. Meanwhile, the supported information is selected from the information of the supported type, thereby meeting the requirement of supporting information of the designated type.

BRIEF DESCRIPTION OF THE DRAWINGS

The drawings to be used in the description of the embodiments will be described briefly as follows, so that the technical solutions according to the embodiments of the present disclosure will become clearer. It is apparent that the drawings in the following description only illustrate some embodiments of the present disclosure. For those skilled in the art, other drawings may be obtained according to these drawings without any creative work.

FIG. 4-a is a schematic structural diagram of an information delivery device according to an embodiment of the present disclosure;

FIG. 4-b is a schematic structural diagram of another information delivery device according to an embodiment of the present disclosure;

FIG. 4-c is a schematic structural diagram of an information delivery selection model according to an embodiment of the present disclosure;

FIG. 4-d is a schematic structural diagram of another information delivery device according to an embodiment of the present disclosure.

DETAILED DESCRIPTION OF EMBODIMENTS

In order to make the objectives, features and advantages of the present disclosure become more apparent and easily to be understood, the technical solution according to the embodiments of the present disclosure will be described clearly and completely as follows in conjunction with the drawings. It is apparent that the described embodiments are only a few rather than all of the embodiments according to the present disclosure. Any other embodiments obtained by those skilled in the art based on the embodiments in the present disclosure fall in the scope of the present disclosure.

In the specification, claims and the above drawings of the present disclosure, terms "comprise", "have" or any other variations thereof are intended to cover non-exclusive "include", so that a process, a method, a system, an product or a device including a series of units is not limited to the units, but also include other units not explicitly listed, or also include inherent units of the process, method, method, product or device.

For a requirement of supporting information of a certain type, the existing technical solution is to configure a proportion of dedicated flow. Only information of a supported type is allowed to be delivered via the dedicated flow, and the information to be delivered is selected randomly in accordance with the proportion, in response to the page request from a user. Although such technical solution is simple, is easily realized and has a steady flow, it has the following issues: some users are not interested in the supported information delivered under the random control, while some users interested in the supported information is not delivered with the supported information under the random control. Therefore, with such solution of information support strategy, a flow ratio can be controlled while the information delivery effect is poor.

An information delivery method and an information delivery device are provided according to the embodiments of the present disclosure, with which information of a supported type is supported while the information delivery effect is ensured.

Figure 1:
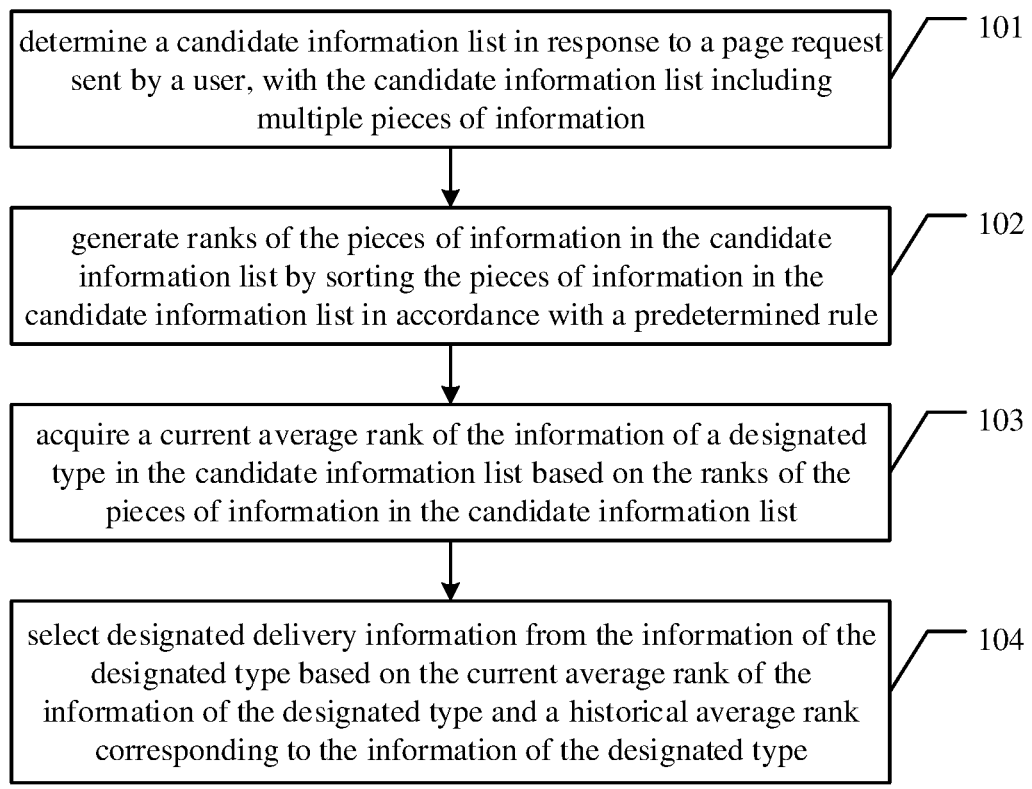
FIG. 1 is a flowchart of an information delivery method according to an embodiment of the present disclosure.

An embodiment of the information delivery method according to the present disclosure may be applied in a scenario for supporting information of a designated type. The information may be advertisement. In addition, the information in the embodiment of the present disclosure may be in a form of resources, contents, data and the like which needs to be supported, which is not limited herein. Referring to FIG. 1, an information delivery method according to an embodiment of the present disclosure may include steps 101 to 104.

In step 101, a candidate information list is determined in response to a page request sent by a user. The candidate information list includes multiple pieces of information.

In the embodiment of the present disclosure, the user may send the page request when accessing a page. The information delivery device according to the embodiment of the present disclosure may receive the page request sent by the user and acquire information related to the user from the page request sent by the user. With the information related to the user, it may be determined in which type of information the user is interested or what kind of content the user want to view, e.g., it may be determined what kind of advertisements the user wants to view. The page request sent by the user may carry apparatus information of a terminal operated by the user, context information of the accessing and attribution information on the user. In this case, the information delivery device may acquire the above information contents from the page request. The information delivery device may perform an initial selection on all of information to be displayed and obtain a candidate information list matching with the user. Since all of information in the candidate information list is obtained by the initial selection performed by the information delivery device, all of the information in the candidate information list may be a type of information that the user is interested in. By performing the initial selection on the information in response to the page request, the information delivery is better targeted to user groups, which is completely different from the random delivery without considering the effect in the conventional technologies. For example, in the embodiments of the present disclosure, an initial selection may be performed on advertisements in response to the page request, and thus the advertisements placement is better targeted to user groups, which is completely different from the random placement without considering the advertisement effect in the conventional technologies.

In some embodiments of the present disclosure, after receiving page request from the user and at the moment of generating candidate information, the target user of the information can be further determined by filtering all of the users in accordance with the page request from the user and the delivery condition predetermined by the information producer. Therefore, a benefit is caused to reduce the poor information delivery effect caused by presenting information not matching with the user. For example, the information is an advertisement, the advertisement made by an advertiser is related to maternal and infant supplies, and a delivery target determined by the advertiser includes females who are 25 to 40 years old. In this case, the target user of the advertisement may be checked according to a requirement of the advertiser. If the page request is sent by a man, it can be determined, by means of the target check, not to deliver the advertisement related to maternal and infant supplies to the man, that is, the advertisement related to the maternal and infant supplies is not included in the candidate information list.

It should be noted that, in the embodiment of the present disclosure, the candidate information list is formed for the user sending the page request. The candidate information list includes multiple pieces of information which may belong to a same information type or different information types. Some information included in the candidate information list may be information of a designated type, such as information of a supported type. For example, the information of the supported type may be an app-type information or other designated types of information. In this embodiment of the present disclosure, information of a supported type is included in the candidate information list, but whether to support the information of the supported type may be determined by the information delivery method described in the following embodiments.

In step 102, ranks of the pieces of information in the candidate information list is generated by sorting the multiple pieces of information in the candidate information list.

In some embodiments of the present disclosure, an order of ranks of the pieces of information in the candidate information list may be predicted based on the page request and a preset prediction model, so as to generate the ranks of the pieces of information in the candidate information list.

In the embodiment of the present disclosure, the candidate information list is determined in an initial selection manner. The ranks of the pieces of information in the candidate information list are predicted based on the page request sent by the user and the preset prediction model. For example, if the candidate information list includes M (M is a natural number not equal to zero) pieces of information, then ranks of a first piece of information, a second piece of information, . . . , an M-th piece of information in the candidate information list are respectively predicted, to generate the ranks of the pieces of information in the candidate information list. The rank of a piece of information indicates a position of the piece of information in the sorted candidate information list. The predicted ranks of the pieces of information in the candidate information list indicates matching degrees between the pieces of information in the candidate information list and the user sending the page request. That is, information having a higher rank in the candidate information list more matches with the user sending the page request.

It should be noted that, in practices, the rank prediction for the pieces of information in the candidate information list may be determined based on the page request from the user and the preset prediction model. For example, the information delivery device may predict the ranks of the pieces of information based on three factors including the user, a context scenario and information. The prediction model may be realized with prediction algorithms such as a logistical regression algorithm and a decision tree algorithm.

In some embodiments of the present disclosure, step 102 in which the ranks of the pieces of information in the candidate information list are predicted based on the page request and the preset prediction model to generate the ranks of the pieces of information in the candidate information list may include step A1.

In step A1, predicted values of click through rates of the pieces of information in the candidate information list are acquired based on the page request and a preset prediction model, and the ranks of the pieces of information in the candidate information list are acquired based on the predicted values of the click through rates of the pieces of information.

The information delivery device may predict click through rates (abbreviated as CTR) of the pieces of information in the candidate information list based on the page request and the preset prediction model. CTR may reflect the user's preference for information (such as advertisement). CTRs of the pieces of information in the candidate information list may be predicted based on the page request from the user and the prediction model to generate predicted values of the CTRs of the pieces of information in the candidate information list. The pieces of information in the candidate information list may be sorted based on the magnitudes of the predicted values of the CTRs, so as to obtain the ranks of the pieces of information in the candidate information list. It should be noted that, the pieces of information may be sorted by calculating the predicted values of the click through rates of the pieces of information, but the present disclosure is not limited to the way of predicted value of click through rates. In practices, the pieces of information may be sorted in other manners. For example, the step A1 of acquiring the ranks of the pieces of information in the candidate information list based on the predicted values of the click through rates of the pieces of information may include steps A11 to steps A12.

In step A11, predicted values of costs of the pieces of information are acquired based on the predicted values of the click through rates of the pieces of information.

In step A12, the predicted values of the costs of the pieces of information in the candidate information list are sorted based on magnitudes of the predicted values of the costs, to obtain the ranks of the pieces of information in the candidate information list.

In step A11, after the predicted value of the CTR of a piece of information is obtained, an expect cost per mile (abbreviated as ECPM) may be calculated based on a cost per click (abbreviated as CPC) of the piece of information, that is, ECPM=CTR*CPC. After being calculated, the predicted values of the costs of the pieces of information in the candidate information list may be sorted based on their magnitudes, to obtain the ranks of the pieces of information in the candidate information list.

In some embodiments of the present disclosure, the information of the designated type may be information of a supported type, i.e., a type of information determined in advance to be supported. In these embodiments of the present disclosure, after step 102 of predicting the ranks of the pieces of information in the candidate information list based on the page request and the preset prediction model to generate the ranks of the pieces of information in the candidate information list, the information delivery method according to the embodiment of the present disclosure may further include the following steps.

It is judged whether a piece of information of the supported type in the candidate information list meets a preset condition, and the following step 103 is performed if the piece of information of the supported type meets the condition. Step 103 includes acquiring a current average rank of the information of the designated type in the candidate information list based on the ranks of the pieces of information in the candidate information list.

In other words, after the ranks of the pieces of information in the candidate information list are generated, the information of the supported type in the candidate information list may be analyzed. It is determined whether to support the information of the supported type based on a preset support condition. If it is determined to support the information of the supported type, the subsequent step 103 is performed, and step 104 may be further performed after step 103. If it is determined not to support the information of the supported type, the subsequent information support process is not performed and the flow may be ended. The information to be presented to the user is determined by the fair competition between the pieces of information in the candidate information list.

It should be understood that, different support conditions may be set as needed, which is not limited in the embodiments of the present disclosure. In practices, the support condition may be determined according to service rules. For example, if the rank of a piece of information of the supported type in the candidate information list is in the last 20% of the whole list, it is indicated that a matching degree between the piece of information of the supported type and the user is low and the piece of information of the support information may not be supported, to avoid a reduction in user satisfaction on the presented information. In addition, the support condition may be set as that the user sends the request via a wireless fidelity (abbreviated as WiFi) connection. In this case, no information support is performed if it is determined based on the page request sent by the user that the user does not use WiFi, thereby avoiding a loss of flow of the user.

In step 103, the current average rank of the information of the designated type in the candidate information list is acquired based on the ranks of the pieces of information in the candidate information list.

In the embodiment of the present disclosure, in the aforementioned step 102, the ranks of the pieces of information in the candidate information list are generated based on the prediction of the ranks of the pieces of information in the candidate information list. Next, a current average rank of the information of a designated type in the candidate information list may be calculated based on the ranks of the pieces of information in the candidate information list. For example, in the case that the designated type is a supported type which is an app-type and the information is an advertisement, an advertisement of a supported type may be an app-type advertisement. In this case, a current average rank of app-type advertisements in a candidate advertisement list is calculated. For example, if the rank of an app-type advertisement 1 in the candidate advertisement list is $t_1$ and the rank of an app-type advertisement 2 in the candidate advertisement list is $t_2$, then the current average rank of the app-type advertisement is $(t_1+t_2)/2$. It should be understood that, if there is one advertisement of the supported type, then the rank of the advertisement in the candidate advertisement list is taken as the current average rank of the advertisement of the supported type. It should be understood that, the way for calculating the rank is described as an example in the above, but the present disclosure is not limited thereto, that is, an existing or subsequently developed algorithm may be used as needed.

In step 104, designated delivery information is selected from the information of the designated type based on the current average rank of the information of the designated type and a historical average rank corresponding to the information of the designated type.

According to some embodiments of the present disclosure, the designated delivery information is information to be delivered in a supported manner, and the historical average rank is a historical support average rank.

In the embodiment of the present disclosure, after the current average rank of the information of the designated type is acquired, a matching degree between the information of the designated type and the user may be determined with the current average rank. Based on a historical average rank corresponding to the supported type, the current average rank of the information of the designated type and the historical average rank corresponding to the designated type may be determined, thereby obtaining a relationship between the current average rank and the historical average rank. The designated delivery information may be selected from the information of the designated type based on the relationship between the current average rank and the historical average rank. For example, in the case that the information of the designated type is information determined to be supported, the historical average rank is an average rank value obtained by performing calculation on historical data of the supported type. The historical support average rank may serve as a reference for determining whether the current information of the designated type should be supported. In practices, the current average rank and the historical support average rank may be analyzed in multiple manners to determine their relationship, based on which it is determined whether to take one or more pieces of information of the supported type as information to be supported. For example, if the current average rank is lower than the historical support average rank, it is indicated that the matching degree between the information of the supported type and the user is high and the information of the supported type may be taken as the information to be supported. It is noted that, the manner of selecting the information to be supported based on the current average rank of the information of the supported type and the historical support average rank corresponding to the supported type is not limited to the above manner, and the information to be supported may be determined with reference to other parametric factors.

In some embodiments of the present disclosure, step 104 of selecting the designated delivery information from the information of the designated type based on the current average rank of the information of the designated type and the historical average rank corresponding to the supported type may include steps C1 to C4.

In step C1, a selection probability of the information of the supported type is calculated based on the current average rank of the information of the designated type and the historical support average rank corresponding to the supported type.

In step C2, a current support satisfaction degree is calculated based on the number of pieces of the information of the supported type which are already selected to be supported, the total number of requests sent by the user and a preset support ratio.

In step C3, a support probability for information of the supported type is calculated based on the selection probability of the information of the supported type and the current support satisfaction degree.

In step C4, it is determined whether to select and output the information of the supported type based on the support probability of the information of the supported type, and the selected information is taken as information to be supported.

Steps C1 to C4 provide a specific implementation for selecting the supported information. In the implementation, the selection probability of the information of the supported type is firstly calculated. The selection probability indicates a probability that the information is selected to be supported, and may be calculated based on the current average rank of the information of the supported type and the historical support average rank corresponding to the supported type. For example, the selection probability of the information of the supported type may be calculated with a normal distribution probability calculation method, that is, a standard normal distribution between the current average rank of the information of the supported type and the historical support average rank corresponding to the supported type may be calculated, to determine a value of the selection probability based on the standard normal distribution. It should be understood that, the above example is only a possible implementation in the embodiment of the present disclosure, and is not intended to limit the present disclosure.

In step C2, the number of pieces of the information of the supported type which are already selected to be supported refers to the number of pieces of information which have been supported before a current request. The total number of the requests sent by the user refers to the number of page requests that have been received by the information delivery device. The support ratio is a product rule, which may be determined in advance as an external parameter of the information delivery device. The information delivery device has the support function. The calculated current support satisfaction degree indicates a satisfaction degree in information support before the current request. If the current support satisfaction degree has an over large value, it is indicated that the support to the information of the supported type needs to be reduced. If the current support satisfaction degree has an over small value, it is indicated that the support to the information of the supported type needs to be enhanced. In practices, the current support satisfaction degree may be calculated based on the number of pieces of the information of the supported type which are already selected to be supported, the total number of the requests sent by the user and the preset support ratio in multiple manners. For example, an already-supported percentage is firstly calculated based on the number of the information of the supported type selected to be supported, and the total number of the requests sent by the user, and then a current support satisfaction degree is obtained by comparing the value of the already-supported percentage and the value of the preset support ratio.

In step C3, after the selection probability of the information of the supported type and the current support satisfaction degree are obtained, the support probability of the information of the supported type may be determined based on the selection probability of the information of the supported type and the current support satisfaction degree. The support probability is a probability that the information of the supported type is to be supported. For example, the support probability of the information of the supported type may be obtained by dividing the selection probability of the information of the supported type by the current support satisfaction degree. It should be noted that, the above implementation is only an example. In practices, the support probability of the information of the supported type may be calculated in other manners. For example, a value obtained by dividing the selection probability of the information of the supported type by the current support satisfaction degree is corrected based on a support factor, to obtain the support probability of the information of the supported type. The support factor may be a proportional correction parameter, which is not limited herein. It may be determined whether to select the information of the supported type for output based on the obtained support probability of the information of the supported type. The selected information is taken as supported information. That is, the supported information may be determined by calculating the support probability, thereby ensuring a stability of the flow for the support.

In some embodiments of the present disclosure, after step 104 of selecting the designated delivery information from the information of the designated type based on the current average rank of the information of the designated type and the historical average rank corresponding to the designated type, the information delivery method according to the embodiment of the present disclosure may further include the following step.

In the step, the historical average rank corresponding to the supported type is updated based on the current average rank of the information of the supported type, and the updated historical average rank corresponding to the supported type is stored.

Particularly, the historical average rank may be a historical support average rank. The historical support average rank corresponding to the supported type may be an average value of historical ranks which is updated dynamically. After information to be supported is determined in response to the current request, the historical support average rank may be updated in real time, so as to provide the updated historical support average rank corresponding to the supported type for a next request. In this case, it is ensured that the historical support average rank is a latest average value in real time, thereby ensuring an uniform flow for the support.

It can be seen from the above embodiments that, the candidate information list is firstly selected in response to the page request sent by the user. The candidate information list includes multiple pieces of information. Then, the ranks of the pieces of information in the candidate information list are predicted based on the page request and the configured predication model to generate the ranks of the pieces of information in the candidate information list. Next, the current average rank of the information of the supported type in the candidate information list is acquired based on the ranks of the pieces of information in the candidate information list. Finally, information to be supported is selected from the information of the supported type based on the current average rank of the information of the supported type and the historical support average rank corresponding to the supported type. In the embodiment of the present disclosure, after the user sends a page request, an initial selection is performed on all of the pieces of information in response to the page request to obtain a candidate information list matching with the user. Thus, the information delivery is better targeted to user groups. A current average rank of information of a supported type in the candidate information list may be obtained by predicting ranks of the pieces of information in the candidate information list. Finally, information to be supported is selected from the information of the supported type based on the current average rank of the information of the supported type and a historical support average rank corresponding to the supported type. Since the selected information to be supported is determined based on the current average rank and the historical support average rank corresponding to the supported type, the selected information to be supported is information best matching with the user sending the page request in all of the pieces of information in the candidate information list, thereby matching with interests of the user and ensuring an information delivery effect. Meanwhile, the supported information is selected from the information of the supported type, thereby meeting an information support requirement for the information of the designated type.

Figure 2:
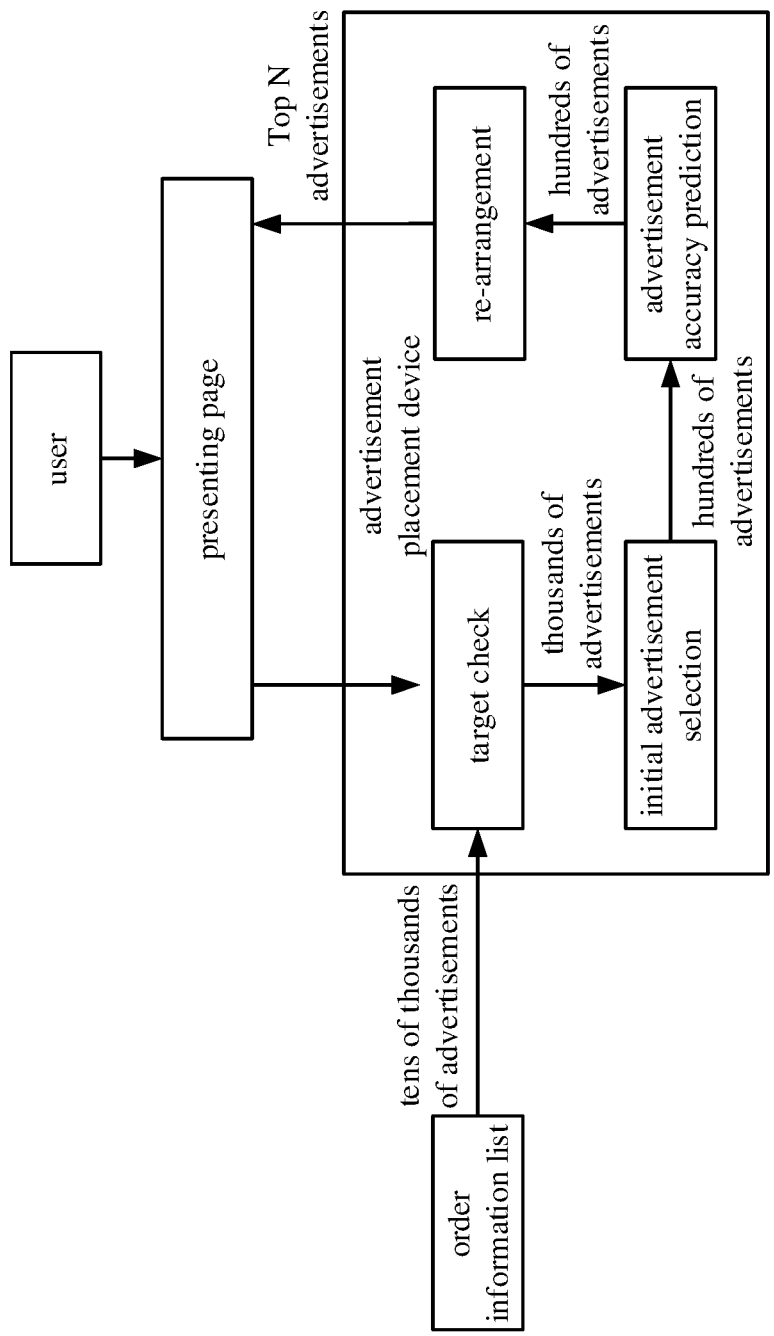
FIG. 2 is a schematic diagram of an implementation of an information delivery device according to an embodiment of the present disclosure.
Figure 3:
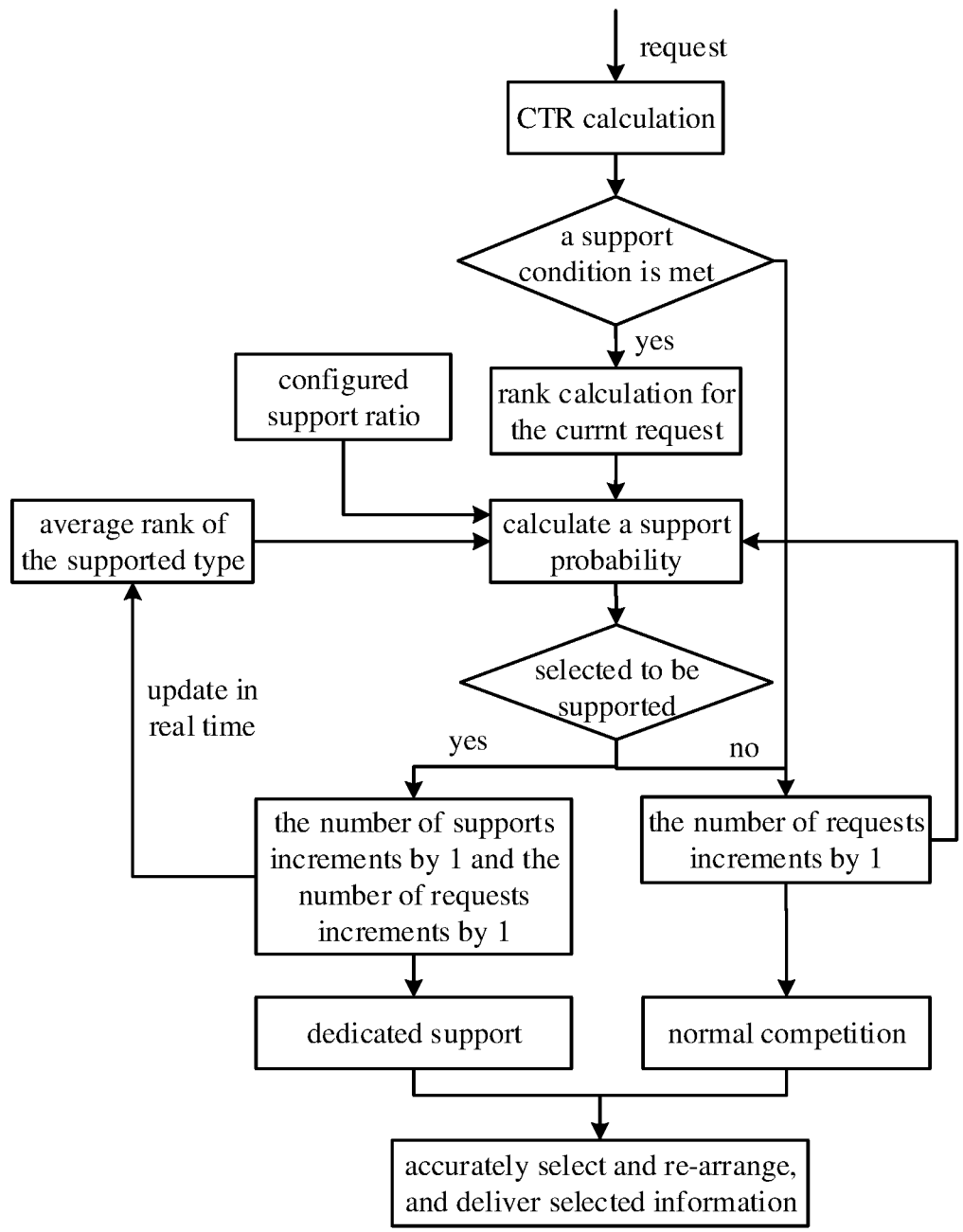
FIG. 3 is a schematic diagram of an implementation of an information delivery method according to an embodiment of the present disclosure.

In order to better understand and implement the above solution of the embodiment of the present disclosure, the above solution is described in detail with an exemplary application. Next, the description is made with an example in which the information designated to be supported is an advertisement. References are made to FIG. 2 and FIG. 3. FIG. 2 is a schematic diagram of an implementation of an information delivery device according to an embodiment of the present disclosure, and FIG. 3 is a schematic diagram of an implementation of an information delivery method according to an embodiment of the present disclosure. In the embodiment of the present disclosure, a selective support solution based on real-time calculation is introduced. In the selective support solution, a rank of a candidate advertisement for a request is compared with an average rank of advertisements already selected to be supported. If the rank of the candidate advertisement is higher, a probability that the candidate advertisement is selected to be supported is high; otherwise, a probability that the candidate advertisement is selected to be supported is low. With the solution, it is not only ensured that the number of supported pieces of information meets a requirement, but also ensured that the support quality is good, thereby improving an advertisement delivery effect. As shown in FIG. 2, an implementation of an advertisement support device according to the embodiment of the present disclosure is illustrated. An advertisement support process generally includes the following processes of target check, initial advertisement selection (selecting hundreds of preferred advertisements from tens of thousands of advertisements), advertisement accuracy prediction and re-arranging, which are respectively described in detail hereafter. A user may send a page request via a presenting page. The advertisement support device receives the page request from the user. All of available advertisements are recorded in an ordered advertisement list. Taking ten thousands of advertisements as an example, thousands of advertisements remains after the target check. Then, the initial advertisement selection is performed, and hundreds of remaining advertisements form a candidate advertisement list. Next, click through rates of all of the advertisements in the candidate information list are accurately predicted. Finally, a rearrangement is performed, for example, based on ECPM, and the most preferred advertisement is delivered. The support strategy is generally implemented in the initial selection since the advertisement need to be supported may be filtered out in the initial selection if the support strategy is implemented in a subsequent process. Top N advertisements to be presented to the user are selected from the candidate advertisement list. The ToP N advertisements may include advertisements of a supported type and normal-competitive advertisements. Next, a detail process of advertisement support according to the present disclosure is described with an example, as shown in FIG. 3. First, an advertisement selection process in the initial selection is described.

1. CTR Calculation

The CTR calculation is the basis for the process, in which it is calculated, in real time, predicted values of click through rates of the advertisements in the candidate advertisement list corresponding to the current request with a model. The prediction model may be implemented by logical regression, decision tree, or other algorithms.

2. Support Condition Judgment

It is judged whether to perform a support process for the request according to service rules. There may be multiple service conditions. For example, the support process is to be performed for the current request only if at least N advertisements of the type correspond to the request, otherwise a free competition process is performed for the request. The value of N depends on a service scenario. If the number of the advertisements of the type is too small, the advertisements may be completely filtered out in subsequent processes, resulting in no advertisement to be presented for the current request. For another example, in the case of supporting an app-type advertisement, the advertisement is supported only if it is judged that the current request is transmitted via a WiFi connection. The advertisement cannot be supported in a non-WiFi environment due to a low conversion rate in the non WiFi environment.

3. Rank Calculation for the Current Request (The Obtained Result is Represented with Rank_this)

A current average rank of advertisement of the supported type for the current request is calculated. The rank may be an average value of top M advertisements, instead of an average value of all of advertisements to be supported, since only top advertisements are displayed for one request. In a case of carousel advertisements, top N advertisements are determined according to a carousel page rule, while only top 1 advertisement is determined in a case of non-carousel advertisement. The rank may be calculated based on the CTR rank or ECPM rank according to a service requirement.

4. Historical Support Average Rank (The Obtained Result is Represented with Rank_avg)

In an initialization operation, an average rank of an advertisement of the supported type is obtained with historical data. In the case of a new advertisement meeting the support requirement, the summed rank values of a support list and the number of supported advertisement are updated with rank_this, to recalculate the historical support average rank. In the embodiment of the present disclosure, a historical support average rank may be calculated in real time for each request, thereby ensuring a real-time updating of the average rank of the supported type.

5. Support Calculation

Inputs of the calculation may include rank_this, rank_avg, the total number of requests, the number of pieces of information which are selected to be supported, and a configured support ratio. It is outputted with a result whether to select the respective piece of information in association with the current request is to be selected for supporting. The support calculation includes the following three parts.

1) A selection probability is calculated based on rank_this and rank_avg.

If rank_this is less than rank_avg, that is, the current average rank corresponding to the current request is before the historical support average rank, which indicates a high matching degree between a support-type advertisement corresponding to the current request and the user, the probability that the support-type advertisement is selected to be supported is great. The method for calculating the probability includes but is not limited to a normal distribution probability calculation method which is described below with an example. Taking rank_avg as an average value, a variance $\sigma$ is updated in real time with a support list, to obtain a standard normal distribution u=(rank_avg−rank_this)/$\sigma$. A coverage area a is acquired by querying a normal distribution probability mapping table with u. If data having variance less than 2 times the standard variance is reliable, then the selection probability p_match is calculated with the following method:

| | |
|---|---|
| p_match = a | in a case of $-2 < z < 2$; |
| p_match = 1 | $z >= 2$; and |
| p_match = 0 | $z <= -2$. |

P_match reflects a preference degree on the support-type advertisement, of the user sending the current request.

2) the current support satisfaction degree is calculated based on the number of current supports, the total number of requests and the configured support ratio.

p_now=the number of the current supports/the total number of the requests;

p_need=the support ratio; and p_satisfy=p_now/p_need.

If p_satisfy>1, it indicates that the support is sufficient, and needs to be reduced. Otherwise, it indicates that the support is insufficient and needs to be increased.

3) The support probability is calculated as p_select=p_match/p_satisfy. A probability that a piece of information is selected increases with an increasing matching degree of the current request and a decreasing current satisfaction degree. It may be configured that if p_select is greater than 1, then the information is selected, and if p_select is set less than 1, then the information is not selected. Alternatively, a probability function of p_select may be provided, to determine whether to select the information by means of a probability calculation. The information meeting the above support probability is transmitted via the dedicated flow for support. The entire process is a close loop updated in real time. Each piece of data may be used to correct a current coefficient and affect a selection probability of the next to-be-selected request. A support ratio is adjusted in real time and fluctuated around the configured support ratio, thereby ensuring the stability of the flow for the support in quantity. The flow for the support is used for a user corresponding to a high rank of the advertisement of the type, i.e., a user having a high willingness in clicking an advertisement of the type, thereby ensuring the quality of delivering an advertisement having a high matching degree. In this case, a selective support strategy is realized while ensuring the support ratio.

In the embodiment of the present disclosure, the flow for the support is stable since the ranks of the information are calculated in real time. Based on the prediction of click through rates on advertisements by the user, a flow having a high matching degree is selected dynamically to support an advertisement of a certain type. In this case, the click through rates may be significantly improved while ensuring a support quantity.

It should be noted that, the aforementioned embodiments of method are expressed as a combination of a series of operations, for simplicity. It should be appreciated by those skilled in the art that, the present disclosure is not limited to the order of the operations. It is because some steps may be performed in other orders or simultaneously according to the present disclosure. In addition, it should also be appreciated that, the embodiments described in the specification are preferred embodiments, and not all operations and modules included in the embodiments are necessary to the present disclosure.

In order to better implement the above solutions according to the embodiments of the present disclosure, a device for implementing the above solution is further provided below.

Referring to FIG. 4-a, an information delivery device 400 according to an embodiment of the present disclosure may be applied in delivery of information of a designated type. The information delivery device 400 may be an advertisement support device, and the information in the embodiment of the present disclosure may be other information to be supported, such as resources, contents and data, which is not limited. The information delivery device 400 may include an initial selection module 401, a rank prediction module 402, a current request calculation module 403 and an information delivery selection module 404.

The initial selection module 401 is configured to determine a candidate information list in response to a page request sent by a user. The candidate information list includes multiple pieces of information.

The rank prediction module 402 is configured to predict ranks of the pieces of information in the candidate information list based on the page request and a preset prediction module, to generate the ranks of the pieces of information in the candidate information list.

The current request calculation module 403 is configured to acquire a current average rank of information of a designated type in the candidate information list based on the ranks of the pieces of information in the candidate information list.

The information delivery selection module 404 is configured to determine whether to take the information of the designated type as designated delivery information based on the current average rank of the information of the designated type and a historical average rank corresponding to the designated type.

According to some embodiments of the present disclosure, the information of the designated type is information of the supported type, the designated delivery information is information to be delivered in a supported manner, and the historical average rank is a historical support average rank.

In some embodiments of the present disclosure, the rank prediction module 402 is configured to acquire predicted values of click through rates of the pieces of information in the candidate information list based on the page request and a preset prediction module, and acquire the ranks of the pieces of information in the candidate information list based on the predicted values of the click through rates of the pieces of information.

In some embodiments of the present disclosure, the rank prediction module 402 is configured to acquire predicted values of costs of the pieces of information based on the predicted values of the click through rates of the pieces of information, and sorting the predicted values of the costs of the pieces of information in the candidate information list based on magnitudes of the predicted values of the costs to obtain the ranks of the pieces of information in the candidate information list.

In some embodiments of the present disclosure, referring to FIG. 4-b, the information delivery device 400 may further include a support condition judgment module 405.

The support condition judgment module 405 is configured to, after the rank prediction module 402 predicts the ranks of the pieces of information in the candidate information list based on the page request and the preset prediction module and generate the ranks of the pieces of information in the candidate information list, judge whether the information of the designated type in the candidate information list meets a preset condition, and trigger the current request calculation module 403 if the information of the designated type meets the condition.

In some embodiments of the present disclosure, the information of the designated type may be information of the supported type. In these embodiments of the present disclosure, referring to FIG. 4-c, the information delivery selection module 404 includes: a first calculation unit 4041, a second calculation unit 4042, a third calculation unit 4043, and an information support determination unit 4044.

The first calculation unit 4041 is configured to calculate a selection probability of the information of the supported type based on a current average rank of the information of the supported type and a historical support average rank corresponding to the supported type.

The second calculation unit 4042 is configured to calculate a current support satisfaction degree based on the number of pieces of the information of the supported type which are already selected to be supported, the total number of requests sent by the user and a preset support ratio;

The third calculation unit 4043 is configured to calculate a support probability of the information of the supported type based on the selection probability of the information of the supported type and the current support satisfaction degree.

The information support determination unit 4044 is configured to determine whether to select and output the information of the supported type based on the support probability of the information of the supported type, and determine the selected and outputted information as supported information.

In some embodiments, referring to FIG. 4-d, the information delivery device 400 further includes a history updating module 406.

The history updating module 406 is configured to, after the information of the designated type is determined as designated delivery information, update a pre-stored historical average rank corresponding to the information of the designated type based on the current average rank of the information of the designated type, and store the updated historical average rank corresponding to the information of the designated type.

It can be seen from the description of the above embodiments that, firstly, a candidate information list is determined in response to a page request sent by a user, the candidate information list including multiple pieces of information. Then, an order of ranks of the pieces of information in the candidate information list is predicted based on the page request and a preset prediction model, to generate the ranks of the pieces of information in the candidate information list. Next, a current average rank of the information of a specified-type in the candidate information list is acquired based on the ranks of the pieces of information in the candidate information list. Finally, information to be supported is selected from the information of the supported type based on the current average rank of the information of the supported type and a historical support average rank corresponding to the supported type. In the embodiments of the present disclosure, after the user sends the page request, an initial selection is performed on all of the pieces of information in response to the page request to obtain the candidate information list matching with the user, and hence the information delivery is better targeted to user groups. The current average rank of information of the supported type in the candidate information list is obtained by predicting the ranks of the pieces of information in the candidate information list. Finally, the information to be supported is selected from the information of the supported type based on the current average rank of the information of the supported type and a historical support average rank corresponding to the supported type. Since the selected information to be supported is determined based on the historical support average rank corresponding to the supported type and the current average rank, the selected information to be supported is the information which more matches with the user sending the page request, among all of the pieces of information in the candidate information list, thereby matching with the interests of the user and ensuring the information delivery effect. Meanwhile, the information to be supported is selected from the information of the supported type, thereby meeting the requirement of supporting information of the designated type.

Figure 5:
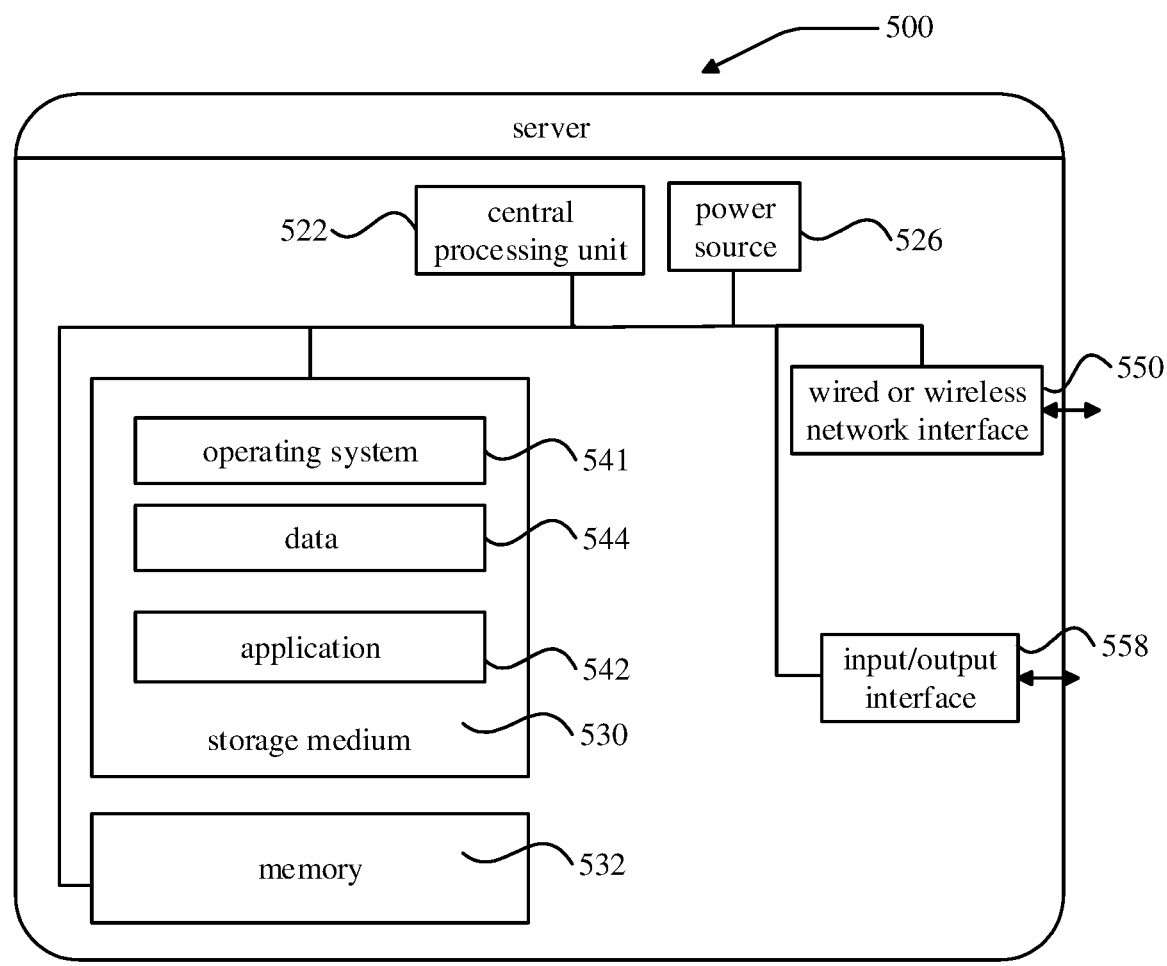
FIG. 5 is a schematic structural diagram of a server applying an information delivery method according to an embodiment of the present disclosure.

FIG. 5 is a schematic structural diagram of a server according to an embodiment of the present disclosure. The server 500 may be greatly different due to different configurations and performances. The server 500 may include one or more central processing units (central processing units, CPU) 522 (such as one or more processors), a memory 532, one or more storage medium 530 for storing an application 542 or data 544 (such as one or more mass storage devices). The memory 532 and the storage medium 530 may perform a temporary storage or persistent storage. A program stored in the storage medium 530 may include one or more modules (not shown in the figure). Each of the modules may include a series of instruction operations for the server. Further, the CPU 522 may be configured to communicate with the storage medium 530, and execute the series of instruction operations in the storage medium 530 on the server 500.

The server 500 may further include one or more power sources 526, one or more wired or wireless network interfaces 550, one or more input/output interfaces 528, and/or, one or more operating systems 541 such as the Windows Server™, Mac OS X™, Unix™, Linux™ and FreeBSD™.

The steps performed by the server in the above embodiments may be based on the server structure shown in FIG. 5. The server may be the information delivery device in the aforementioned embodiments, and the server may perform the information delivery method according to the aforementioned embodiments. For details, reference may be made to the description of the aforementioned embodiments.

In addition, it should be noted that, the devices described in the above are only illustrative. The units illustrated as separate components may be or may not be separated physically, and the component displayed as a unit may be or may not be a physical unit. That is, the components may be located at the same place, or may be distributed on multiple network units. Some of or all of the units may be selected as required, to realize the object of the solution of the embodiment. Besides, in the drawings corresponding to the embodiments of device according to the present disclosure, the connection between modules indicates that there is a communicative connection between the modules, and may be implemented as one or more communicative buses or signal lines, which can be understood and implemented by those skilled in the art without any creative work.

Based on the description of the above embodiments, it can be clearly appreciated by those skilled in the art that the present disclosure may be implemented by means of software and necessary hardware, or may also be implemented with dedicated hardware such as dedicated integrated circuit, dedicated CPU, dedicated memory and dedicated element. Generally, any function realized with computer programs can be easily implemented with corresponding hardware, and various hardware structures can be used for realizing a same function, such as an analog circuit, a digital circuit or a dedicated circuit. However, the present disclosure may be preferably implemented with software programs in most cases. Based on such understanding, the substance of the technical solutions of the present disclosure or the part contributing to the conventional technologies may be embodied in a software product form. The computer software product is stored in a readable storage medium such as a floppy disk, a U-disk, a removable hard-disk, a read-only memory (ROM, Read-Only Memory), a random access memory (RAM, Random Access Memory), a magnetic disk or an optical disk, of the computer. The storage medium includes multiple instructions for enabling a computer device (such as a personal computer, a server or a network device) to perform the method according to the embodiments of the present disclosure.

In summary, the above embodiments are only for illustrating the technical solutions of the present disclosure, and are not intended to limit the present disclosure. Although the present disclosure is described in detail with reference to the above embodiments, it should be understood that, modifications may be made to the technical solutions according to the above embodiments or equivalent substitutions may be made to a part of technical features, by those skilled in the art. These modifications or substitutions do not make the technical solutions depart from the spirit and scope of the technical solutions of the present disclosure.

The invention claimed is:

1. An information delivery method, applied in a server comprising a processor and a memory, the information deliver method comprising:
   determining, by the processor, a candidate advertisement list in response to a page request sent by a user terminal, wherein the candidate information list comprises a plurality of advertisements, the plurality of advertisements belonging to multiple advertisement types;
   generating, by the processor, initial ranks of the advertisements in the candidate advertisement list by sorting the plurality of advertisements in the candidate advertisement list in accordance with matching the user sending the page request;
   determining a connection type of the user terminal that sends the page request according to transmission of the page request, the connection type being either a WiFi connection or a non-WiFi connection;
   determining, by the processor, a number of advertisements of a designated type in the candidate advertisement list, the advertisements of the designated type being a supported type of advertisements placed by a same producer or a supported type of advertisements that promote an app;
   obtaining a preset threshold number configured to indicate a number of the advertisements of the designated type needs to reach for being prioritized;
   comparing, by the processor, the number of advertisements of the designated type with the preset threshold number;
   upon determining that the connection type is WiFi connection and the number of advertisements of the designated type is greater than the preset threshold number, selecting, by the processor, the designated delivery advertisement from the plurality of advertisements based on adjusted ranks, comprising:
      acquiring a current average rank of the advertisements of the supported type in the candidate advertisement list based on the ranks of the pieces of advertisements in the candidate advertisement list;
      calculating, by the processor, a selection probability of the advertisements of the supported type based on the current average rank of the advertisements of the supported type and the historical support average rank corresponding to the supported type;
      calculating, by the processor, a current support satisfaction degree based on a number of advertisements of the supported type which are already selected to be supported, a total number of requests sent by the user, and a preset support ratio;
      calculating, by the processor, a support probability for prioritizing the advertisements of the supported type based on the selection probability of the advertisements of the supported type and the current support satisfaction degree;
      adjusting, by the processor, a rank of each advertisement of the supported type in the candidate advertisement list according to the support probability to obtain the adjust ranks; and
      selecting, by the processor, the designated delivery advertisement from the candidate advertisement list based on the adjusted ranks;
   upon determining that the number of advertisements of the designated type is not greater than the preset threshold number, selecting, by the processor, the designated delivery advertisement from the plurality of advertisements based on the initial ranks;
   upon determining that the connection type is non-WiFi connection, selecting, by the processor, the designated delivery advertisement from the plurality of advertisements based on the initial ranks; and
   sending a response of the page request to the user terminal, wherein the response includes the designated delivery advertisement and causes the user terminal to display the designated delivery advertisement.

2. The information delivery method according to claim 1, wherein, the sorting the plurality of advertisements in the candidate advertisement list comprises:
   predicting the ranks of the advertisements in the candidate advertisement list based on the page request and a preset prediction model to generate the ranks of the advertisements in the candidate advertisement list.

3. The information delivery method according to claim 2, wherein the predicting the ranks of the advertisements in the candidate advertisement list comprises:
   acquiring predicted values of click through rates of the advertisements in the candidate advertisement list based on the page request and a preset prediction model, and
   acquiring the ranks of the advertisements in the candidate advertisement list based on the predicted values of the click through rates of the pieces of information.

4. The information delivery method according to claim 3, wherein the acquiring the ranks of the advertisements in the candidate advertisement list based on the predicted values of the click through rates of the advertisements comprises:
   acquiring predicted values of costs corresponding to the advertisements based on the predicted values of the click through rates of the advertisements; and
   sorting the predicted values of the costs of the advertisements in the candidate advertisement list based on magnitudes of the predicted values of the costs, to obtain the ranks of the advertisements in the candidate advertisement list.

5. The information delivery method according to claim 1, after selecting an advertisement of the supported type as the designated delivery advertisement, further comprising:

updating the historical average rank corresponding to the advertisement of the supported type based on the current average rank of the advertisement of the supported type, and storing the updated historical average rank corresponding to the advertisement of the supported type.

6. The information delivery method according to claim 1, wherein, the sorting the plurality of advertisements in the candidate advertisement list in accordance with the predetermined rule comprises:

acquiring values of costs of the advertisements based on predicted values of click through rates of the advertisements;

sorting the predicted values of the costs of the advertisements based on magnitudes of the predicted values of the costs, to obtain the ranks of the advertisements in the candidate advertisement list.

7. The information delivery method according to claim 1, wherein, the acquiring values of costs of the advertisements based on predicted values of click through rates of the advertisements comprises:

calculating, for each advertisement in the candidate advertisement list, an expected cost per mile based on a cost per click of the advertisement and the click through rate of the piece of information, to obtain the predicted value of cost of the piece of information.

8. The information delivery method according to claim 1, wherein:

the support probability increases with an increase of the selection probability; and the support probability increases with a decrease of the current support satisfaction degree.

9. An information delivery device, comprising one or more processors and a memory for storing program instructions, wherein the one or more processors is configured to execute the program instructions to perform the following operations:

determining a candidate advertisement list in response to a page request sent by a user terminal, wherein the candidate information list comprises a plurality of advertisements, the plurality of advertisements belonging to multiple advertisement types;

generating initial ranks of the advertisements in the candidate advertisement list by sorting the plurality of advertisements in the candidate advertisement list in accordance with matching the user sending the page request;

determining a connection type of the user terminal that sends the page request according to transmission of the page request, the connection type being either a WiFi connection or a non-WiFi connection;

determining a number of advertisements of a designated type in the candidate advertisement list, the advertisements of the designated type being a supported type of advertisements placed by a same producer or a supported type of advertisements that promote an app;

obtaining a preset threshold number configured to indicate a number of the advertisements of the designated type needs to reach for being prioritized;

comparing the number of advertisements of the designated type with the preset threshold number;

upon determining that the connection type is WiFi connection and the number of advertisements of the designated type is greater than the preset threshold number, selecting the designated delivery advertisement from the plurality of advertisements based on adjusted ranks, comprising:

acquiring a current average rank of the advertisements of the supported type in the candidate advertisement list based on the ranks of the pieces of advertisements in the candidate advertisement list;

calculating a selection probability of the advertisements of the supported type based on the current average rank of the advertisements of the supported type and the historical support average rank corresponding to the supported type;

calculating a current support satisfaction degree based on a number of advertisements of the supported type which are already selected to be supported, a total number of requests sent by the user, and a preset support ratio;

calculating a support probability for prioritizing the advertisements of the supported type based on the selection probability of the advertisements of the supported type and the current support satisfaction degree;

adjusting a rank of each advertisement of the supported type in the candidate advertisement list according to the support probability to obtain the adjust ranks; and selecting the designated delivery advertisement from the candidate advertisement list based on the adjusted ranks;

upon determining that the number of advertisements of the designated type is not greater than the preset threshold number, selecting the designated delivery advertisement from the plurality of advertisements based on the initial ranks;

upon determining that the connection type is non-WiFi connection, selecting the designated delivery advertisement from the plurality of advertisements based on the initial ranks; and sending a response of the page request to the user terminal, wherein the response includes the designated delivery advertisement and causes the user terminal to display the designated delivery advertisement.

10. The information delivery device according to claim 9, wherein the one or more processors is configured to execute the program instructions to perform the following operation:

predicting the ranks of the advertisements in the candidate advertisement list based on the page request and a preset prediction model, to generate the ranks of the advertisements in the candidate advertisement list.

11. The information delivery device according to claim 10, wherein the one or more processors is configured to execute the program instructions to perform the following operations:

acquiring predicted values of click through rates of the advertisements in the candidate advertisement list based on the page request and a preset prediction model, and acquiring the ranks of the advertisements in the candidate advertisement list based on the predicted values of the click through rates of the advertisements.

12. The information delivery device according to claim 11, the one or more processors is configured to execute the program instructions to perform the following operations:

acquiring predicted values of costs corresponding to the advertisements based on the predicted values of the click through rates of the advertisements, and sorting the predicted values of the costs of the advertisements in the candidate advertisement list based on magnitudes of the predicted values of the costs to obtain the ranks of the advertisements in the candidate advertisement list.

13. The information delivery device according to claim 9, the one or more processors is configured to execute the program instructions to perform the following operations:

updating the historical average rank corresponding to the advertisement of the supported type based on the current average rank of the advertisement of the supported type after an advertisement of the supported type is selected as the designated delivery advertisement, and storing the updated historical average rank corresponding to the advertisement of the supported type.

14. A non-transitory computer-readable storage medium storing machine-executable instructions, wherein the instructions are configured to cause a machine to:

determine a candidate advertisement list in response to a page request sent by a user terminal, wherein the candidate information list comprises a plurality of advertisements, the plurality of advertisements belonging to multiple advertisement types;

sort the plurality of advertisements in the candidate advertisement list in accordance with matching the user sending the page request, to generate initial ranks of the advertisements in the candidate advertisement list;

determine a connection type of the user terminal that sends the page request according to transmission of the page request, the connection type being either a WiFi connection or a non-WiFi connection;

determine a number of advertisements of a designated type in the candidate advertisement list, the advertisements of the designated type being a supported type of advertisements placed by a same producer or a supported type of advertisements that promote an app;

obtain a preset threshold number configured to indicate a number of the advertisements of the designated type needs to reach for being prioritized;

compare the number of advertisements of the designated type with the preset threshold number;

upon determining that the connection type is WiFi connection and the number of advertisements of the designated type is greater than the preset threshold number, select the designated delivery advertisement from the plurality of advertisements based on adjusted ranks, comprising:

acquiring a current average rank of the advertisements of the supported type in the candidate advertisement list based on the ranks of the pieces of advertisements in the candidate advertisement list;

calculating a selection probability of the advertisements of the supported type based on the current average rank of the advertisements of the supported type and the historical support average rank corresponding to the supported type;

calculating a current support satisfaction degree based on a number of advertisements of the supported type which are already selected to be supported, a total number of requests sent by the user, and a preset support ratio;

calculating a support probability for prioritizing the advertisements of the supported type based on the selection probability of the advertisements of the supported type and the current support satisfaction degree;

adjusting a rank of each advertisement of the supported type in the candidate advertisement list according to the support probability to obtain the adjust ranks; and selecting the designated delivery advertisement from the candidate advertisement list based on the adjusted ranks;

upon determining that the number of advertisements of the designated type is not greater than the preset threshold number, select the designated delivery advertisement from the plurality of advertisements based on the initial ranks;

upon determining that the connection type is non-WiFi connection, select the designated delivery advertisement from the plurality of advertisements based on the initial ranks; and send a response of the page request to the user terminal, wherein the response includes the designated delivery advertisement and causes the user terminal to display the designated delivery advertisement.

\* \* \* \* \*